(12) United States Patent
Hindi et al.

(10) Patent No.: US 9,687,812 B1
(45) Date of Patent: Jun. 27, 2017

(54) METHOD FOR MAKING CARBONACEOUS SPONGE-LIKE SORBENT

(71) Applicant: KING ABDULAZIZ UNIVERSITY, Jeddah (SA)

(72) Inventors: Sherif Shawki Zaki Hindi, Jeddah (SA); Attieh A. Alghamdy, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 14/958,901

(22) Filed: Dec. 3, 2015

(51) Int. Cl.
*B01J 20/32* (2006.01)
*B01J 20/20* (2006.01)
*B01J 20/26* (2006.01)
*B01J 20/30* (2006.01)

(52) U.S. Cl.
CPC ............. *B01J 20/20* (2013.01); *B01J 20/261* (2013.01); *B01J 20/3007* (2013.01); *B01J 20/3042* (2013.01)

(58) Field of Classification Search
CPC ................................. B01J 20/32; B01J 20/26
USPC ........................................................ 502/402
See application file for complete search history.

(56) References Cited

U.S. PATENT DOCUMENTS

| 3,341,341 A | 9/1967 | Corson et al. |
| 6,458,883 B1 | 10/2002 | Takashima et al. |
| 7,892,436 B2 | 2/2011 | Gadgil |
| 2009/0280313 A1 | 11/2009 | Song et al. |
| 2012/0278956 A1 | 11/2012 | Hartman |

*Primary Examiner* — Edward Johnson
(74) *Attorney, Agent, or Firm* — Richard C. Litman

(57) ABSTRACT

The method for making a carbonaceous sponge-like sorbent includes mixing a volume of carbon-rich fly ash with a binder. The carbon-rich fly ash may be air dried prior to mixing with the binder. For example, the volume of fly ash can be placed in a hopper and a binder can be added to the volume of fly ash by spraying or the like. The binder can be a polyvinyl acetate emulsion. The binder and the volume of fly ash can be mixed in the hopper by a mechanical stirrer or the like to form a carbonaceous mixture. A conveyer can transfer the carbonaceous mixture from the hopper to the press for pressing the carbonaceous mixture into a block of carbonaceous sponge-like sorbent. The produced block of carbonaceous sponge-like sorbent can then be transferred to a dryer for drying and curing the binder therein.

11 Claims, 4 Drawing Sheets

US 9,687,812 B1

METHOD FOR MAKING CARBONACEOUS SPONGE-LIKE SORBENT

BACKGROUND OF THE INVENTION

1. Field of the Invention

The present invention relates to the manufacture of sorbents, and particularly to the manufacture of a carbonaceous sponge-like sorbent.

2. Description of the Related Art

Fly ash is one of the residues generated by coal combustion, and is composed of the fine particles that are driven out of the boiler with the flue gases. In the past, fly ash produced from coal combustion was simply entrained in flue gases and dispersed into the atmosphere. This, however, created environmental and health concerns that prompted laws that have reduced fly ash emissions to less than 1% of ash produced. Worldwide, more than 65% of fly ash produced from coal power stations is disposed of in landfills and ash ponds. The recycling of fly ash has become increasing important in recent years due to increasing landfill costs and current interest in sustainable development.

Thus, a method for making a carbonaceous sponge-like sorbent from fly ash solving the aforementioned problems is desired.

SUMMARY OF THE INVENTION

The method for making a carbonaceous sponge-like sorbent includes drying carbon-rich fly ash and then mixing the dried fly ash with a binder, such as a polyvinyl acetate emulsion, preferably with a polyvinyl acetate concentration in the emulsion of 18 wt %. The binder and the volume of fly ash can be mixed in a hopper by a mechanical stirrer or the like to form a carbonaceous mixture, preferably with a binder to fly ash ratio of 1:1 by weight. The carbonaceous mixture can be conveyed from the hopper to the press for pressing the carbonaceous mixture into blocks or briquettes of the carbonaceous sponge-like sorbent. The produced carbonaceous sponge-like sorbent is then dried. The carbonaceous sponge-like sorbent has a high degree of permeability (on the order of 1,200 m$^2$/g), thus forming a carbonaceous "sponge" (i.e., a porous, sponge-like structure) with a high degree of permeability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for making a carbonaceous sponge-like sorbent includes mixing carbon-rich fly ash with a polyvinyl acetate emulsion to form the carbonaceous sponge-like sorbent. The carbon-rich fly ash can be collected from a desalination plant or the like. Prior to mixing with the polyvinyl acetate, the carbon-rich fly ash is dried. For example, the carbon rich fly ash can first be air dried, and then further dried at a temperature of approximately 100° C. for a period of approximately two hours in an electric oven, or by drying with a solar collector at a temperature of approximately 70° C. for a period of approximately six hours. The carbonaceous sponge-like sorbent has a high degree of permeability, on the order of 1,200 m$^2$/g (measured by the N$_2$-gas method).

The present carbonaceous sponge-like sorbent can be used instead of traditional activated charcoal for sorption of pollutants from water. Crude carbon-rich fly ash used to make the present carbonaceous sponge-like sorbent was found to have a fixed carbon content of 79.79 wt %, an ash content of 7.03 wt %, a volatile matter content of 5.83 wt % and a moisture content of 7.23 wt %. This may be compared against a sample of conventional activated charcoal derived from coconut shell, which has a fixed carbon content of 84.79 wt %, an ash content of 6.43 wt %, a volatile matter content of 7.99 wt % and a moisture content of 6.11 wt %.

Figure 1:
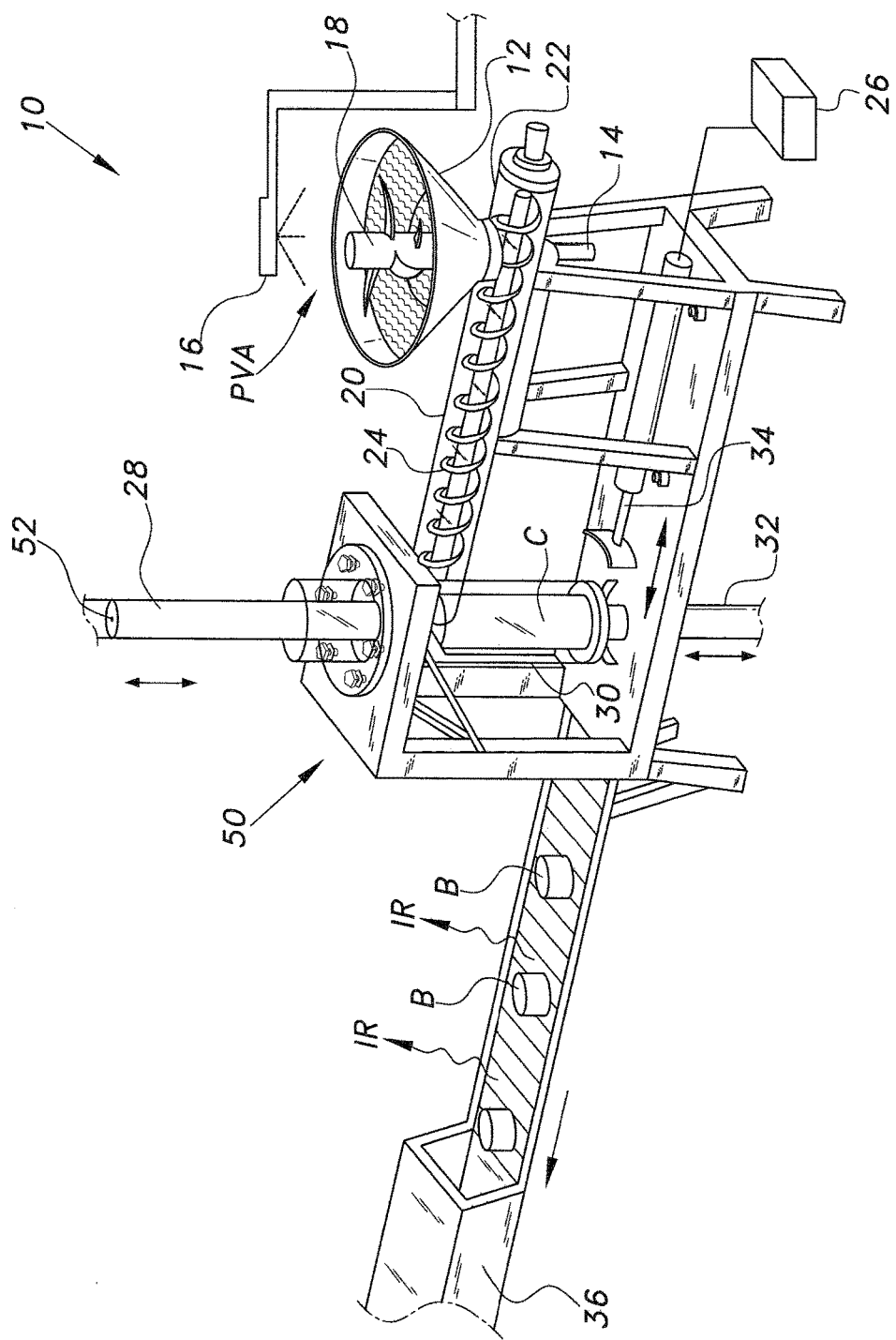
FIG. 1 is a perspective view of an exemplary system for making a carbonaceous sponge-like sorbent according to the present invention.

A system for making the carbonaceous sponge-like sorbent 10 is shown in FIG. 1. As shown in FIG. 1, following drying, the volume of fly ash is placed in a hopper 12 of the system for making the carbonaceous sponge-like sorbent 10. Inside the hopper 12, a binder is added to the volume of fly ash by spraying or the like. The binder can be a polyvinyl acetate (PVA) emulsion. In FIG. 1, sprayer 16 is shown positioned directly over a substantially conical hopper 12 for spraying the PVA emulsion on the fly ash. It should be understood that the relative positioning and configurations of both sprayer 16 and hopper 12 are shown for exemplary purposes only, and that any suitable type of sprayer (or any other suitable type of applicator) may be used in combination with any suitable type of hopper or receptacle. The PVA emulsion is formed from PVA in water, with the concentration of PVA in the overall PVA/water emulsion being 18 wt %, although it should be understood that any suitable concentration of PVA may be used.

The PVA emulsion binder and the volume of fly ash are mixed in the hopper 12 by a mechanical stirrer 18 or the like to form a carbonaceous mixture. In FIG. 1, mechanical stirrer 18 is shown being driven by a conventional motor 14, although it should be understood that any suitable type of stirrer or mixer may be used and that mechanical stirrer 18 is shown for exemplary purposes only. Additionally, it should be understood that any suitable type of motor or other drive may be used for driving stirrer 18. Preferably, the PVA to fly ash ratio is 1:1 by weight, although it should be understood that any suitable ratio may be used.

As shown, a hollow tube 22 may extend between hopper 12 and a press 50, with the hollow tube 22 being in open communication with hopper 12 and a molding tube 30 of press 50. A worm gear 24 inside hollow tube 22, which may be driven to rotate via linkage with motor 14, is used to transfer the carbonaceous mixture from hopper 12 to press 50. Although the overall conveyer 20 is shown in FIG. 1 as being formed from worm gear 24 inside hollow tube 22, it should be understood that conveyer 20 is shown for exemplary purposes only and that any suitable type of conveyer or transfer device may be used to transfer the carbonaceous mixture from hopper 12 to press 50.

As shown, the press 50 includes a vertically-oriented molding tube 30 in communication with the conveyer 20 for receiving the carbonaceous mixture C, along with a vertical piston 28 which is slidably received within the molding tube 30. In FIG. 1, the molding tube 30 is shown as being substantially cylindrical for formation of a substantially cylindrical briquette or block of a carbonaceous sponge-like sorbent B. It should be understood that molding tube 30 may have any desired contouring and relative dimensions for formation of the carbonaceous sponge-like sorbent of any desired size and shape. Similarly, the lower end 38 of the vertical piston 28, which slidably seals the molding tube 30, above the carbonaceous mixture C, for compacting the carbonaceous mixture C, may also have any suitable contouring and dimensions, dependent on the selected contouring and relative dimensions of molding tube 30. As best seen in FIG. 1, an axial passage 52 may be formed through vertical piston 28 (and the lower end 38 thereof) for delivering pressurized air or the like therethrough. Following compaction of the carbonaceous mixture C, the pressurized air may be used to ensure that each of the formed blocks of carbonaceous sponge-like sorbents B are easily released from lower end 38 and the interior of molding tube 30. The axial passage 52 is relatively small in diameter. For purposes of illustration, for a cylindrical molding tube 30 with an interior diameter of 3 cm (and, correspondingly, a vertical piston 28 with a diameter of approximately 3 cm), the axial passage 52 could have a diameter on the order of 2 mm, thus providing ample volume for delivery of the pressurized air but without interfering with the molding of the briquettes or blocks of carbonaceous sponge-like sorbents B.

Figure 2A:
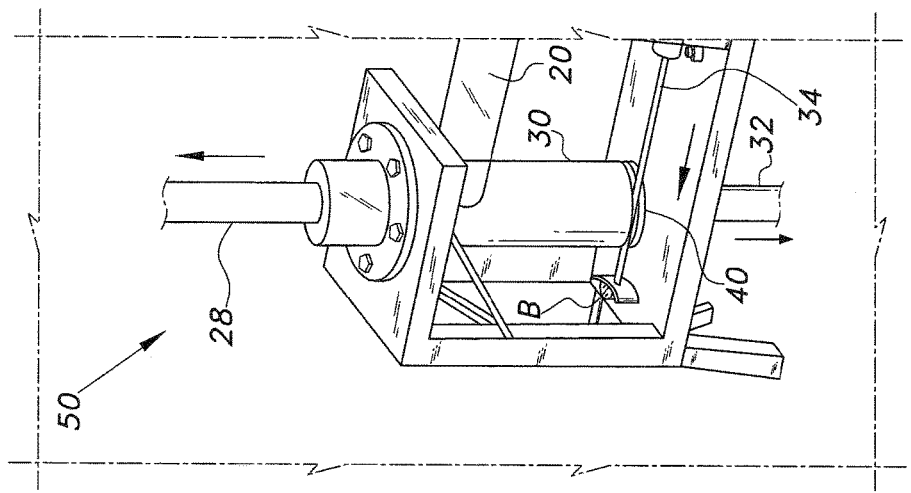
FIG. 2A is a partial perspective view of a press of the system for making the carbonaceous sponge-like sorbent, shown in a state of partial compaction.

In FIG. 1, molding tube 30 is shown filled with the carbonaceous mixture C. In the configuration of FIG. 2A, piston 28 is driven downwardly (by any suitable type of drive system, such a linear actuator, a pneumatic cylinder or the like) such that lower end 38 of vertical piston 28 compresses the carbonaceous mixture. As further shown in FIG. 2A, during the compaction process, the upper end 40 of a vertical stand 32 selectively seals a lower end 44 of the molding tube 30. The upper end 40 of vertical stand 32 may have any suitable contouring and dimensions, dependent on the selected contouring and relative dimensions of molding tube 30.

Figure 2B:
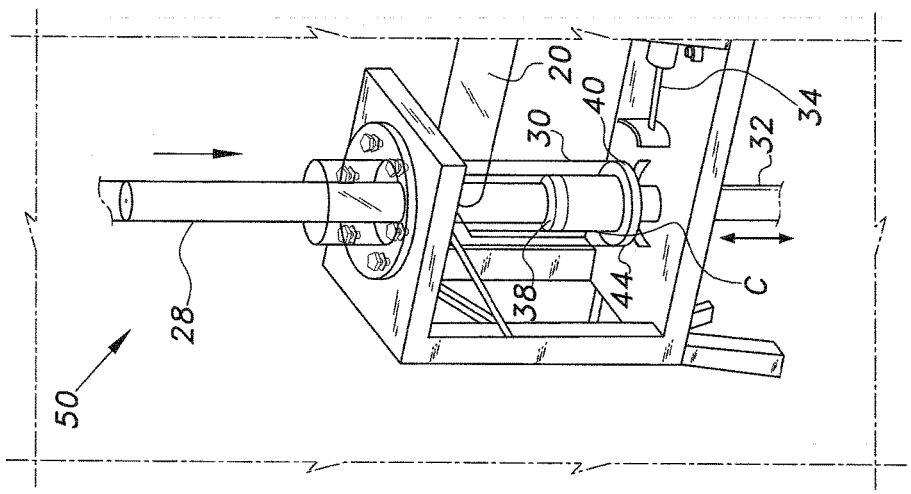
FIG. 2B is a partial perspective view of the press of the system for making the carbonaceous sponge-like sorbent, shown post-compaction.
Figure 3A:
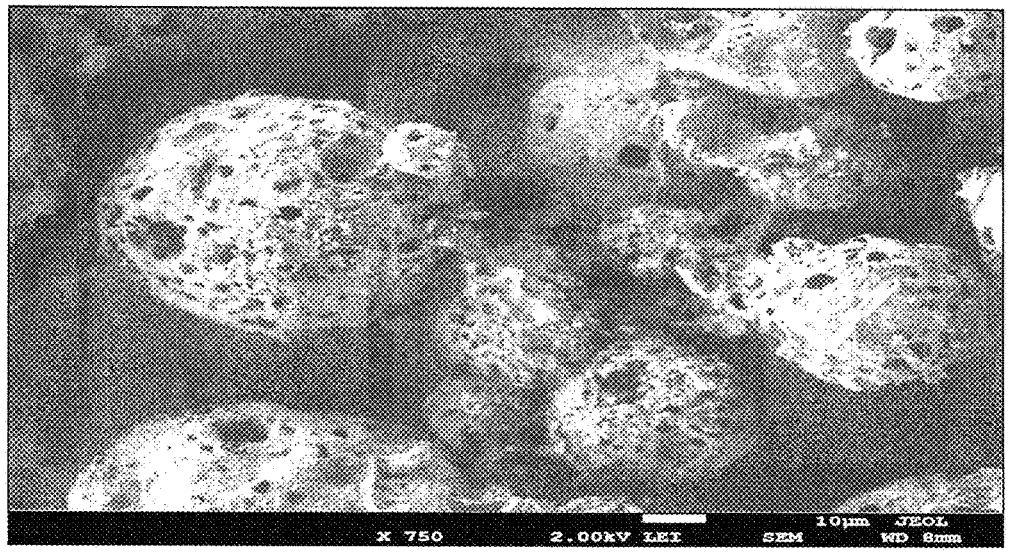
FIGS. 3A, 3B, 3C and 3D are scanning electron microscope (SEM) images showing the microstructure of the carbonaceous sponge-like sorbent, shown at magnifications of 750×, 1500×, 3000× and 7500×, respectively.
Figure 3B:
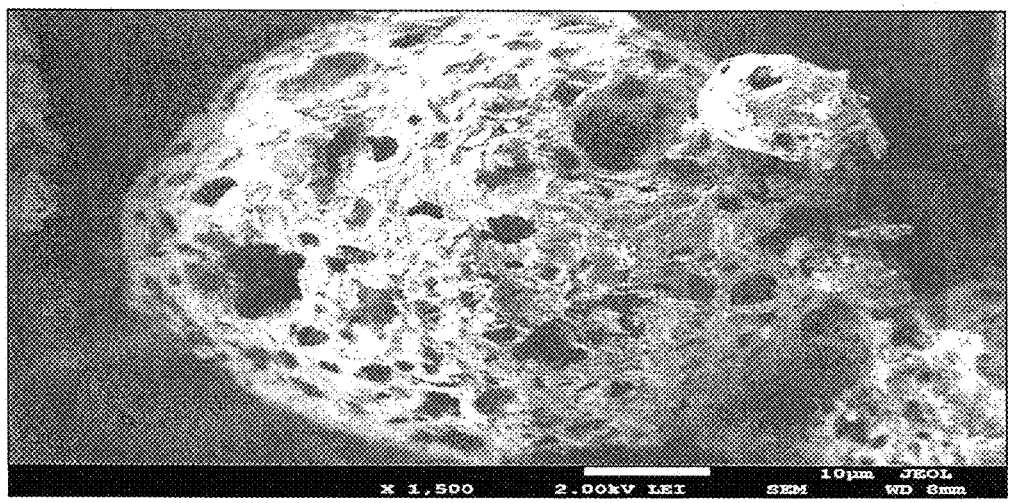
Figure 3C:
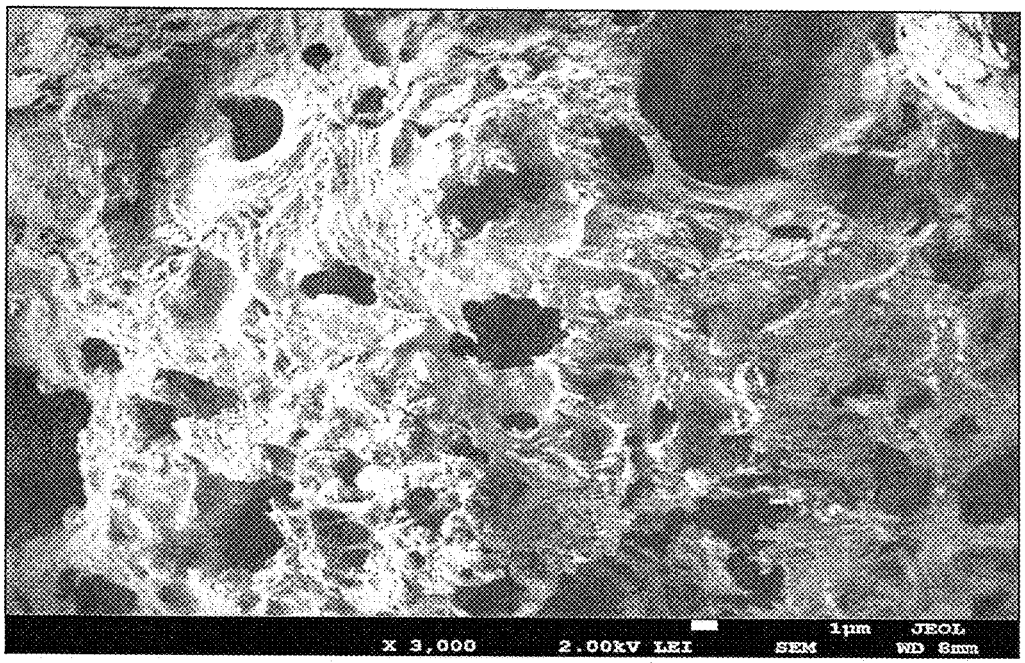
Figure 3D:
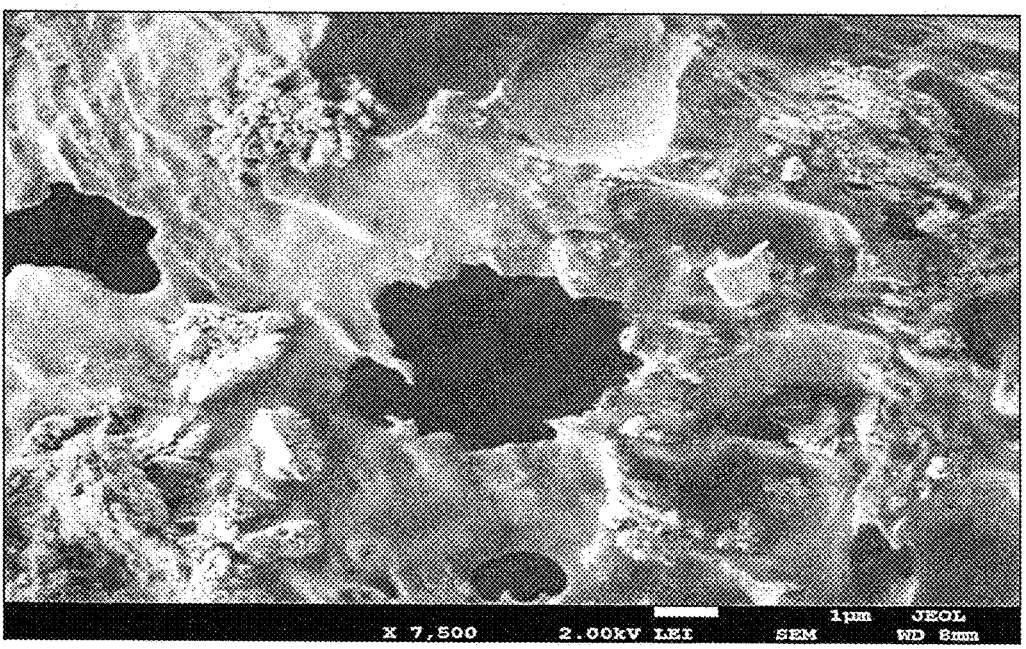

As shown in FIG. 2B, the vertical stand 32 is selectively vertically adjustable such that, following compaction, the produced carbonaceous sponge-like sorbents B may be lowered out of molding tube 30, exiting the open lower end 44 of the molding tube 30. It should be understood that vertical stand 32 is selectively driven upward and downward by any suitable type of drive system, such a linear actuator, a pneumatic cylinder or the like.

Once the blocks of carbonaceous sponge-like sorbents B have been lowered out of molding tube 30, they are positioned on table 42, adjacent a pneumatic piston 34. The pneumatic piston 34 horizontally transfers the produced carbonaceous sponge-like sorbents B from beneath the molding tube 30 to a dryer 36, which is preferably in the form of an infrared conveyer, as shown in FIG. 1, which irradiates the carbonaceous sponge-like sorbents B with infrared (IR) radiation as they pass therealong. The infrared radiation dries and cures the binder in the blocks of carbonaceous sponge-like sorbents B. It should be understood that any suitable type of pneumatic piston, driven by any suitable type of pneumatic controller 26, may be utilized or, alternatively, the pneumatic piston 34 may be replaced by any suitable type of linear actuator or the like. Similarly, it should be understood that any suitable type of dryer may be utilized for drying and curing the binder in the carbonaceous sponge-like sorbent B. Preferably, infrared drying is used, as application of the IR radiation causes the polyvinyl acetate binder to rearrange its chemical structure to form a polycyclic aromatic.

FIGS. 3A, 3B, 3C and 3D are scanning electron microscope (SEM) images showing the microstructure of the produced carbonaceous sponge-like sorbent B at magnifications of 750×, 1500×, 3000× and 7500×, respectively. The diameters of agglomerated carbonaceous balls found on the surfaces of the samples of the carbonaceous sponge-like sorbent B produced by the above method vary widely between samples, ranging between 34.44 µm and 65.08 µm. Additionally, pore diameters within the agglomerated carbonaceous balls differed between 0.75 µm and 8.04 µm. The SEM images also indicate that the carbonaceous sponge-like sorbents have a vast permeable structure which would be suitable for sorption of fluids in water treatment and industrial purification.

It is to be understood that the present invention is not limited to the embodiments described above, but encompasses any and all embodiments within the scope of the following claims.

We claim:

1. A method of making a carbonaceous sponge-like sorbent, comprising the steps of:
adding a binder to a volume of fly ash, the binder comprising a polyvinyl acetate emulsion;
mixing the binder and the volume of fly ash to form a carbonaceous mixture;
pressing the carbonaceous mixture into a block of carbonaceous sponge-like sorbent; and
drying and curing the carbonaceous sponge-like sorbent.

2. The method of making a carbonaceous sponge-like sorbent as recited in claim 1, wherein the step of adding the binder to the volume of fly ash comprises spraying the binder on the fly ash.

3. The method of making the carbonaceous sponge-like sorbent as recited in claim 1, further comprising drying the fly ash prior to the step of adding the binder to the volume of fly ash.

4. The method of making the carbonaceous sponge-like sorbent as recited in claim 1, wherein drying and curing the carbonaceous sponge-like sorbent comprises irradiating the carbonaceous sponge-like sorbent with infrared radiation.

5. The method of making the carbonaceous sponge-like sorbent as recited in claim 1, wherein the polyvinyl acetate emulsion has a polyvinyl acetate concentration of 18 wt %.

6. The method of making the carbonaceous sponge-like sorbent as recited in claim 5, wherein the carbonaceous mixture comprises a 1:1 by weight ratio of the polyvinyl acetate to the fly ash.

7. A method of making a carbonaceous sponge-like sorbent, comprising the steps of:
spraying a binder on a volume of fly ash, the binder comprising a polyvinyl acetate emulsion;
mixing the binder and the volume of fly ash to form a carbonaceous mixture;
pressing the carbonaceous mixture into a block of carbonaceous sponge-like sorbent; and
drying and curing the carbonaceous sponge-like sorbent.

8. The method of making a carbonaceous sponge-like sorbent as recited in claim 7, further comprising drying the fly ash prior to the step of spraying the binder on the volume of fly ash.

9. The method of making the carbonaceous sponge-like sorbent as recited in claim 7, wherein drying and curing the carbonaceous sponge-like sorbent comprises irradiating the carbonaceous sponge-like sorbent with infrared radiation.

10. The method of making the carbonaceous sponge-like sorbent as recited in claim 7, wherein the polyvinyl acetate emulsion has a polyvinyl acetate concentration of 18 wt %.

11. The method of making the carbonaceous sponge-like sorbent as recited in claim 10, wherein the carbonaceous mixture comprises a 1:1 by weight ratio of the polyvinyl acetate to the fly ash.

\* \* \* \* \*